United States Patent
Dybro et al.

(10) Patent No.: US 10,660,268 B2
(45) Date of Patent: May 26, 2020

(54) HARVESTER WITH ELECTROMAGNETIC PLANE CROP MATERIAL FLOW SENSOR

(71) Applicant: Deere and Company, Moline, IL (US)

(72) Inventors: Niels Dybro, Sherrard, IL (US); William D. Todd, Bettendorf, IA (US); Gurmukh H. Advani, West Fargo, ND (US); Noel W. Anderson, Fargo, ND (US); Nathan R. Vandike, Geneseo, IL (US); Bhanu Kiran Palla, Hyderabad (IN)

(73) Assignee: Deere & Company, Moline, IL (US)

( * ) Notice: Subject to any disclaimer, the term of this patent is extended or adjusted under 35 U.S.C. 154(b) by 177 days.

(21) Appl. No.: 15/844,523

(22) Filed: Dec. 16, 2017

(65) Prior Publication Data

US 2019/0183047 A1 Jun. 20, 2019

(51) Int. Cl.
*A01D 41/127* (2006.01)
*A01F 12/44* (2006.01)

(52) U.S. Cl.
CPC ..... *A01D 41/1272* (2013.01); *A01D 41/1271* (2013.01); *A01F 12/44* (2013.01)

(58) Field of Classification Search
CPC .............. A01D 75/282; A01D 41/1271; A01D 41/1273; A01D 41/1272; A01D 41/141; A01D 41/02; A01F 12/44; A01F 12/448
USPC .......... 56/10.2 R, 10.2 A–10.2 E; 460/1, 4–7
See application file for complete search history.

(56) References Cited

U.S. PATENT DOCUMENTS

| | | | |
|---|---|---|---|
| 3,345,626 | A | 10/1967 | Thomas |
| 4,360,998 | A | 11/1982 | Somes |
| 5,480,354 | A | 1/1996 | Sadjadi |
| 5,775,072 | A | 7/1998 | Herlitzius et al. |
| 5,871,397 | A | 2/1999 | Nelson et al. |
| 5,970,800 | A | 10/1999 | Gunneskov et al. |
| 6,233,473 | B1 | 5/2001 | Shepherd et al. |
| 6,449,334 | B1 | 9/2002 | Mazess et al. |
| 6,526,120 | B1 | 2/2003 | Gray et al. |
| 6,678,396 | B2 | 1/2004 | Bartle |
| 6,816,564 | B2 | 11/2004 | Charles, Jr. et al. |
| 9,112,389 | B2 * | 8/2015 | Singh ........................ F03G 7/00 |
| 9,445,546 | B2 * | 9/2016 | May .................... A01D 75/282 |
| 10,085,379 | B2 * | 10/2018 | Schleusner ......... G06K 9/00114 |
| 2005/0143153 | A1 | 6/2005 | Behnke et al. |
| 2013/0112529 | A1 | 5/2013 | Wooldridge et al. |
| 2017/0032473 | A1 | 2/2017 | Koch et al. |
| 2017/0248453 | A1 | 8/2017 | Herlitzius et al. |

FOREIGN PATENT DOCUMENTS

| | | |
|---|---|---|
| EP | 0310938 | 4/1989 |
| EP | 0843959 | 5/1998 |
| WO | WO1985000087 | 1/1985 |

OTHER PUBLICATIONS

Schafer, David, X-ray System Provided Improved Baggage Screening http://www.photonics.com/Article.aspx?AID=18637(Apr. 2004).

(Continued)

*Primary Examiner* — Robert E Pezzuto
(74) *Attorney, Agent, or Firm* — Rathe Lindenbaum LLP

(57) ABSTRACT

A harvester may include a grain processing unit and a material flow sensor to form an yes electromagnetic plane or field through which crop material passes while being sensed.

20 Claims, 8 Drawing Sheets

(56) References Cited

OTHER PUBLICATIONS

Arslan, Selcuk; Inanc, Seyzi; Gray, Joseph N.; Colvin, Thomas S.; Application of X-Ray in Precision Farming; Review of Progress in Quntitative Nondestructive Evaluation, American Insitute of Physics, 1931 (2000); http://scitation.aip.org/content/aip/proceeding/aipcp/10.1063/1.1291308(2000), AIP Conf. Proc. 509, 1931 (2000); http://dx.doi.org/10.1063/1.1291308 Conference date: Jul. 25-30, 1999.

"Grain Flow Measurements with X-Ray Techniques" by Arslan, Inanc, Gray, and Colvin. http://www.researchgate.net/publication/222839570_Grain_flow_measurements_with_X-ray_techniques (Mar. 2000).

Veal, Matthew Wayne, Enhanced Grain Crop Yield Monitor Accuracy Through Sensor Fusion and Post-Processing Algorithms, Disseration, The Graduate School Univ. of Kentucky (2006).

European Search Report for 18211648.3-1006 dated May 8, 2019.

\* cited by examiner

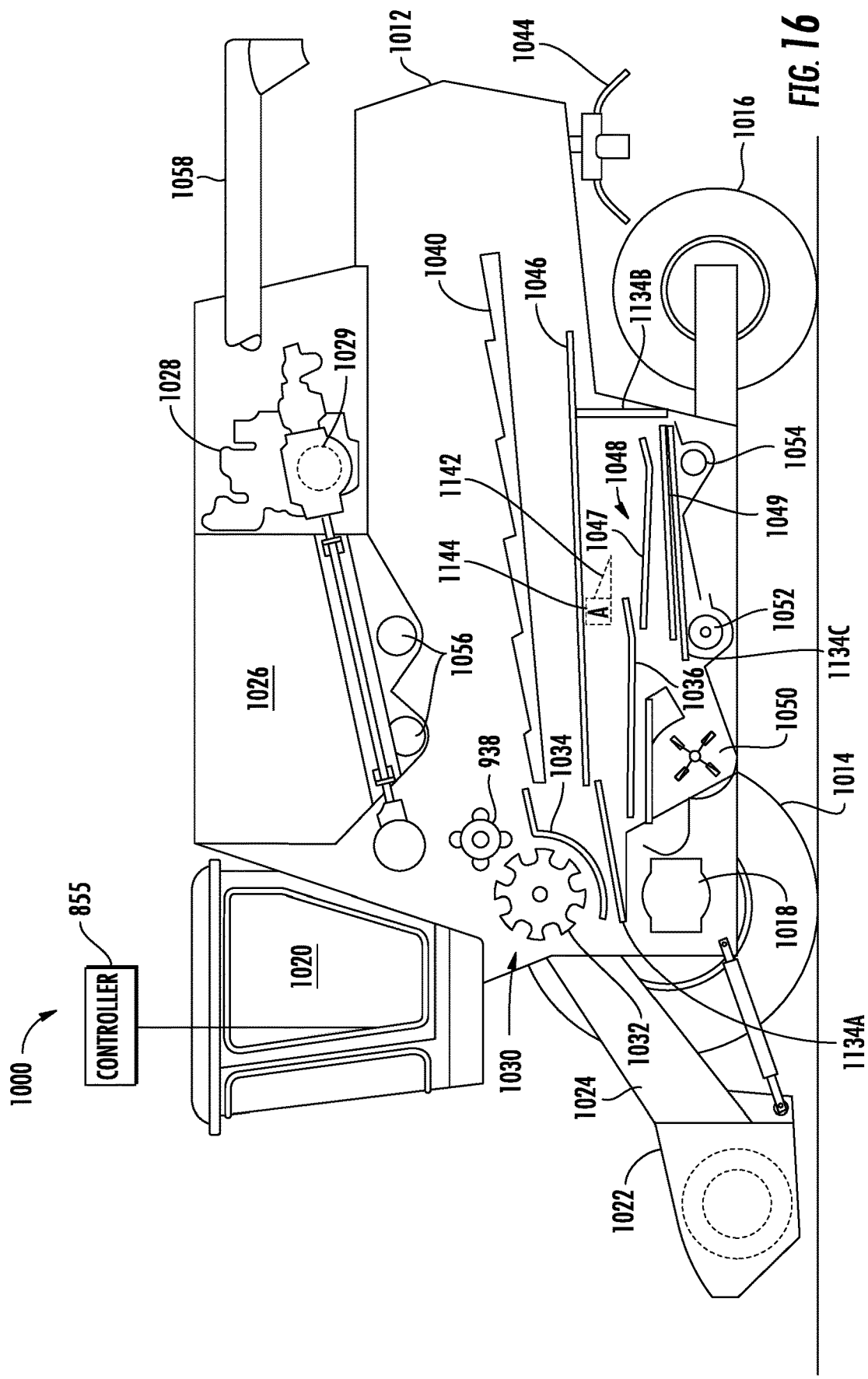

HARVESTER WITH ELECTROMAGNETIC PLANE CROP MATERIAL FLOW SENSOR

BACKGROUND

Harvesters are used to harvest crop from a field. The crop material includes both grain and materials other than grain. Such harvesters may separate the grain from the other materials (sometimes referred to as biomass) by passing the crop material through multiple separation stages. Measuring grain yield and measuring the biomass of the crop material may provide valuable information for operating the harvester and for future management of the field.

BRIEF DESCRIPTION OF THE DRAWINGS

FIG. 16 is a diagram of portions of an example harvester.

Figure 1:
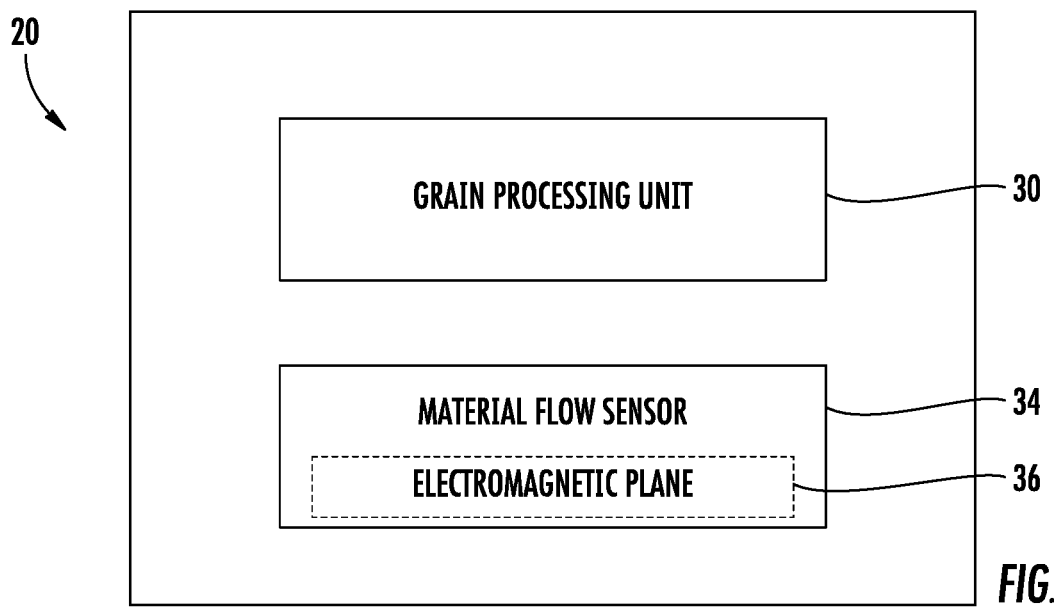
FIG. 1 is a schematic diagram of portions of an example harvester.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example harvesters that facilitate the measurement of grain and biomass materials other than grain, sometimes referred to as material other than grain (MOG). The example harvesters facilitate the detection and determination of material intake, grain loss and/or relative positioning or distribution of crop material within different portions of the harvester. The example harvesters utilize a material flow sensor that forms an electromagnetic plane through which crop material passes will being sensed. In one implementation, the electromagnetic plane is formed by a single electromagnetic field panel or unit. In other implementations, the electromagnetic plane is formed by multiple electromagnetic field panels are units which are supported adjacent one another. For example, in one implementation, the electromagnetic plane may be formed by a grid or array of electromagnetic field units.

In some implementations, the electromagnetic plane has an aggregate area (an area through which grain passes that is formed by a single unit or multiple units) of at least 1 foot by 4 feet. In some implementations, the material flow sensor comprises a single panel forming a single electromagnetic plane having an area of at least 1 foot×4 feet and in one implementation, 1 foot×5 feet. In some implementations, the material flow sensor is formed from multiple side-by-side, adjacent units that form a collective electromagnetic plane that has an aggregate area of at least 1 foot×5 feet. In some implementations, the electromagnetic plane is formed by a two-dimensional array or grid of multiple spaced electromagnetic units, wherein the array or grid has at least two individual electromagnetic units in at least one dimension of the plane.

The electromagnetic plane or EM plane measures the mass of material passing between harvester subsystems. Such EM planes are located within the harvester to measure quantities such as total biomass, grain and materials other than grain or other relevant material masses. Placement of such EM planes reduces latency between the harvest of the plant material and the mass data availability for purposes such as georeferenced agronomic data collection and machine control.

The material flow sensors utilizing such electromagnetic planes are based upon EM signal transformation caused by electric field and material interactions as the material passes through the EM field between the planes resulting in predominantly the attenuation of EM Signal. In other implementations, reflection, absorption, backscatter, phase shift or a combination of such measured interactions between the material and the EM field may be detected or utilized. Electromagnetic radiation is emitted by one or more emitters, wherein the EM radiation interacts with material it encounters. Some of the EM radiation interacts (backscatter, reflection) and reaches detectors. Other EM radiation is absorbed by the material. Still other portions of the EM radiation fails to interact with material, is transmitted through the material, and reaches one or more detectors opposite the emitters.

The relatively large area of the electromagnetic plane utilized by the material flow sensor facilitates the sensing of crop flow prior to substantially complete separation of the grain from the MOG. The large area of the electromagnetic plane utilized by the material flow sensor facilitates the sensing of crop flow at earlier stages in the processing of the crop, prior to the crop being separated and condensed or focused into a stream of substantially clean grain entering a grain tank of the harvester and prior to the crop being substantially reduced in volume after removal of most of the grain from the crop flow. As a result, grain yield measurements and biomass measurements may be estimated at earlier points in time, rather than simply prior to discharge into the grain tank. The earlier grain yield measurements and biomass measurements may facilitate more accurate mapping of yield to regions of a field for enhanced field management.

In some implementations, signals from the electromagnetic plane are utilized by controller to adjust operation parameters of the harvester. Signals from the electromagnetic plane may be used to adjust a configuration of the crop processing or crop separation stage itself, movement of the crop processing or crop separation stage or the positioning of at least one crop flow deflector. For example, in some implementations, the material flow sensor may detect different levels of crop flow through different regions of the electromagnetic plane, indicating an imbalance of crop flow through the electromagnetic plane. Such an imbalance may create unbalanced loading of a chaff or sieve. Signals from the material flow sensor may be utilized to adjust a tilt of a floating step pan or the tilt of a chaffer or sieve as it is being reciprocated to provide a more uniform, even loading of the chaffer or sieve. Signals from the material flow sensor may be utilized to adjust at least one deflector which adjust the flow of crop material, such as the flow of crop material from a rotor or the flow of crop material from straw walkers to the underlying chambers and sieves. At least one deflector may be repositioned based upon signals from the material flow sensor to adjust the flow of crop material between different separation frames or sieves for more even loading of the various separation frames or sieves.

Disclosed herein is an example harvester which may comprise a grain processing unit and a material flow sensor. The material flow sensor forms at least one electromagnetic plane through which crop material passes will being sensed. The at least one electromagnetic plane has an aggregate area of at least 1 foot by 4 feet.

Disclosed herein is an example harvester that may comprise a feeder house to convey crop material, a grain holding tank, at least one auger to convey grain, separated from the crop material, to the holding tank and a multistage separation unit to separate grain from crop material other than grain. The multistage separation unit may comprise an inlet to directly receive the crop material from the feeder house, a first outlet region through which the grain separated from the crop material is directly discharged to the auger and a second outlet region through which crop material not directed through the first outlet is discharged from the multistage separation unit. The harvester further comprises an electromagnetic plane sensor forming a sensing plane across at least one of the first outlet region and the second outlet region.

Disclosed herein is an example harvester that may comprise a multistage separation unit to separate grain from crop material other than grain a grain processing unit and a material flow sensor to form an electromagnetic plane through which crop material passes while being sensed. The electromagnetic plane is sandwiched between consecutive stages of the separation unit.

Disclosed herein is an example method for determining grain yield. The method may comprise receiving first signals indicating sense crop flow through an electromagnetic field or plane at a crop processing stage of a grain processing unit, receiving second signals indicating sense crop flow through an output of the grain processing unit and determining grain yield based upon a combination of the first signals and the second signals. In one implementation, grain yield was determined by subtracting the volume or mass indicated by the second signals from the volume or mass indicated by the first signals. In one implementation, the first signals indicating sensed crop flow through the electromagnetic plane are located beneath a rotor of the grain processing unit, whereas the second signals indicate sense crop flow through an electromagnetic plane after the crop flow has been further filtered by the last sieve of the grain processing unit.

Disclosed herein is an example method for adjusting operating parameters of a harvester. The method may comprise receiving first signals indicating sense crop flow through a first portion of an electromagnetic plane at a crop processing stage of a grain processing unit and receiving second signals indicating crop flow through a second portion of the electromagnetic plane at the crop processing stage of the grain processing unit. The method may comprise positioning a deflector based upon the first signals and the second signals to direct crop flow. In other implementations, the method may comprise adjusting an angle or tilt of at least one separation frame or sieve based upon the first signals and the second signals.

FIG. 1 is a schematic diagram illustrating portions of an example harvester 20. Harvester 20 may be configured to traverse a field as the harvester separates crop material from the soil or growing medium and gathers the separated crop material for further separation and cleaning. The harvester 20 comprises a grain processing unit 30 and a material flow sensor 34.

Grain processing unit 30 comprises a set of harvester components that interact with the separated crop material and that separate the crop material into (A) grain, which is gathered in a grain tank, and (B) MOG which may be discharged from the harvester. Grain processing unit 30 may comprise a multistage separation unit. During each stage, grain portions of the separated crop material are progressively filtered from the MOG and collected.

For example, in one implementation, the grain processing unit may comprise a transverse rotor and concave which receives crop from a feeder house and which forms the first stage of a grain processing unit. Crop material passing through the concave is directed to a series of straw walkers which may walk the crop material in a rearward direction as the crop material is filtered onto an underlying floating pan which deposits the crop material upon a first separation frame of a series of separation frames. The separation frames are sometimes referred to as a chafer or sieves. For example, crop material from the floating pan may deposited upon an upper separation frame, upper sieve or chafer. The crop material may further pass through the upper sieve or chaffer onto at least one lower sieve. The crop material that does not pass through the final filtering stage, such as the final sieve of the grain processing unit, composed mostly of MOG, is discharged with a blower through an outlet of the grain processing unit.

Material flow sensor 34 comprises sensing component that forms an electromagnetic field or plane 36 through which crop material passes while being sensed. In one implementation, material flow sensor 34 forms an electromagnetic plane having an area of at least 1 foot×4 feet and in one implementation, 1 foot×5 feet. In some implementations, the material flow sensor is formed from multiple side-by-side, adjacent units that form a collective electromagnetic plane that has an aggregate area of at least 1 foot×5 feet. In some implementations, the electromagnetic plane is formed by a two-dimensional array or grid of multiple spaced electromagnetic units, wherein the array or grid has at least two individual electromagnetic units in at least one dimension of the plane. In one implementation, the electromagnetic plane formed by the material flow sensor is sandwiched between consecutive stages of a multistage separation unit forming the grain processing unit 30. In one implementation, electromagnetic plane extends across at least one of a grain outlet region or an MOG outlet region of the grain processing unit.

In one implementation, material flow sensor 34 may comprise a frame which supports at least one electromagnetic emitter and at least one electromagnetic detector. For example, the at least one electromagnetic emitter may comprise selected wavelengths of electromagnetic radiation which may be picked up by the corresponding electromagnetic detector. Examples of electromagnetic radiation that may be emitted by the at least one emitter and the detected by the at least one detector include, but are not limited to, microwave, infrared, visible, ultraviolet, X- and gamma rays. The size of the EM plane may depend on factors such as EM wavelength and sampling time. High frequency/short wavelength forms of EM such as gamma rays and x-rays would typically be generated by one or more points sources and form a narrow plane comprising several collimated beams or a continuous fan. Lower frequency/longer wavelength EM such as microwaves may be directed to the sampling volume using a horn antenna with a larger cross section than used with gamma and x-rays. In some implementations, multiple frequency EM signals may be used.

Crop flow through the electromagnetic plane transforms the receipt of the electromagnetic radiation by the electromagnetic detector, indicating crop flow. In some implementations, the electromagnetic emitters and detectors are located on both sides of a plane. In some implementations, the electromagnetic detectors and electromagnetic emitters may be located on one side of the plane, wherein the electromagnetic detectors detect or sense reflection or fringing fields of the electromagnetic radiation off of crop flow across a plane. In some implementations, the electromagnetic detectors detect both electromagnetic radiation emitted by an electromagnetic emitter on an opposite side of the plane, passing through the crop flow, as well as electromagnetic radiation emitted by an electromagnetic emitter on the same side of the plane as the electromagnetic detector, the electromagnetic radiation being reflected off of the crop flow passing through the electromagnetic plane.

Figure 2:
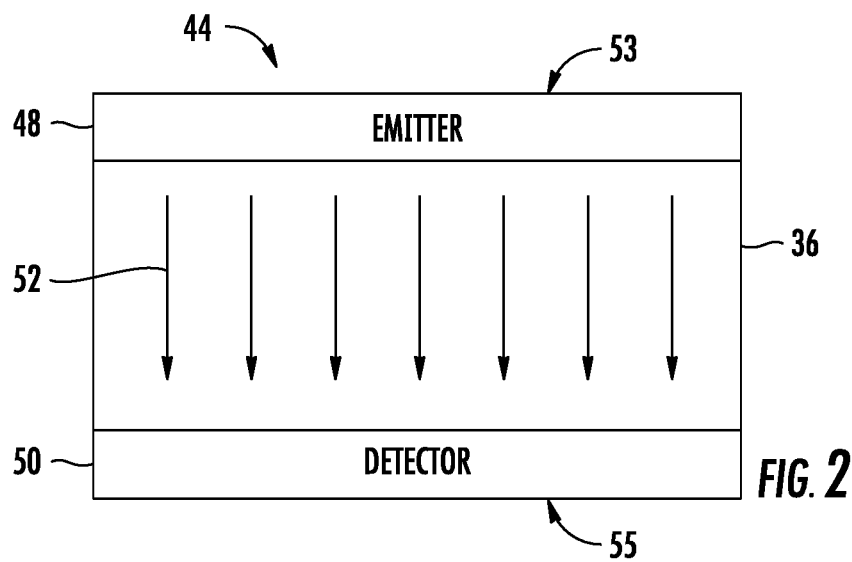
FIG. 2 is a top view of an example material flow sensor forming an example electromagnetic plane.

FIGS. 2-6 illustrate different examples of material flow sensor 34 that may be utilized in harvester 20 or in any of the below described harvesters. Although the figures illustrate a rectangular sensing cross section, any suitable shape may be used. In some examples the emitted signal may engage the detector at an angle of other than 90 degrees as shown. FIG. 2 illustrates material flow sensor 44. Material flow sensor 44 comprises emitter 48 and detector 50. Emitter 48 extends along an entire length of the electromagnetic plane 36 on a first side 53 while detector 50 extends along the entire length of plane 36 on an opposite side 55 of plane 36. Electromagnetic radiation (schematically illustrated by arrows 52) is emitted by emitter 48 and detected by detector 50. In some implementations, some components may serve as both emitters and detectors. Signals from material flow sensor 44 indicate material flow through electromagnetic plane 36.

Figure 3:
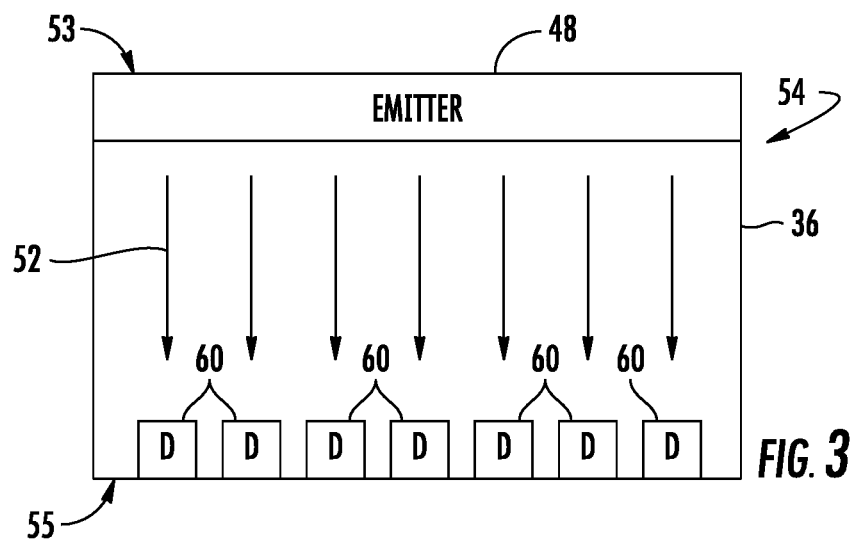
FIG. 3 is a top view of an example material flow sensor forming an example electromagnetic plane.

FIG. 3 illustrates material flow sensor 54. Material flow sensor 54 comprises emitter 48 and individual or discrete detectors 60. Emitter 48 extends along an entire length of the electromagnetic plane 36 while detectors 50 extend along the entire length of plane 36 on an opposite side of plane 36. Electromagnetic radiation (schematically illustrated by arrows 52) is emitted by emitter 48 and detected by detectors 60. Signals from material flow sensor 54 indicate material flow through electromagnetic plane 36. Different signals from different detectors 60 may indicate different crop flow (rate, volume or mass) through different portions or regions of electromagnetic plane 36. For example, signals from those detectors 60 proximate the left side of plane 36 as compared to signals from those detectors 60 proximate the right side of plane 36 may indicate different crop flow through the different regions, a different crop flow through the left region of plane 36 as compared to the right region of plane 36. In some examples, emitter 48 may be a near-point source rather than spanning the width of the sample volume as shown.

Figure 4:
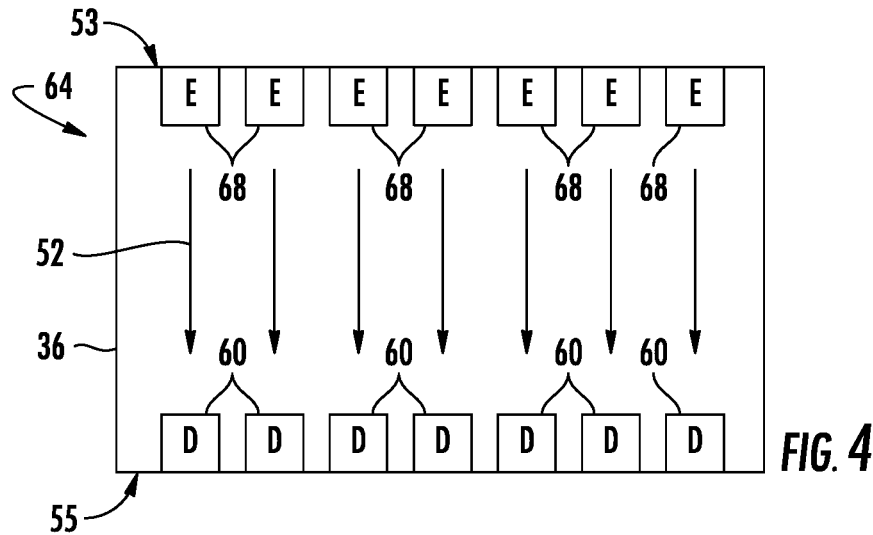
FIG. 4 is a top view of an example material flow sensor forming an example electromagnetic plane.

FIG. 4 illustrates material flow sensor 64. Material flow sensor 64 comprises individual emitters 68 and corresponding individual or discrete detectors 60. Emitters 68 extend along an entire length of the electromagnetic plane 36 while detectors 50 extends along the entire length of plane 36 on an opposite side of plane 36. Electromagnetic radiation (schematically illustrated by arrows 52 is emitted by each emitter 68 and detected by each corresponding detector 60. Signals from material flow sensor 64 indicate material flow through electromagnetic plane 36. Different signals from different detectors 60 may indicate different crop flow (rate, volume or mass) through different portions or regions of electromagnetic plane 36. For example, signals from those detectors 60 proximate the left side of plane 36 as compared to signals from those detectors 50 proximate the right side of plane 36 may indicate different crop flow through the different regions, a different crop flow through the left region of plane 36 as compared to the right region of plane 36.

Figure 5:
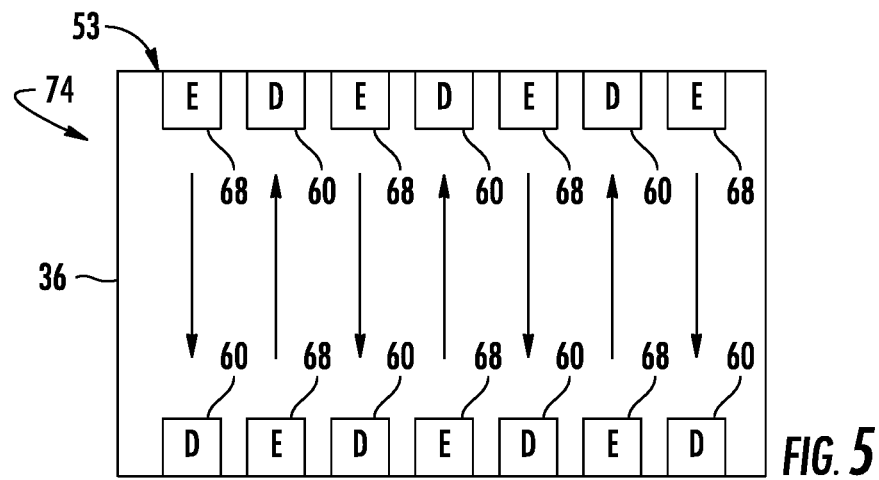
FIG. 5 is a top view of an example material flow sensor forming an example electromagnetic plane.

FIG. 5 illustrates material flow sensor 74. Material flow sensor 74 comprises individual emitters 58 and corresponding individual or discrete detectors 50. Material flow sensor 74 is similar to material flow sensor 64 except that emitters 58 and detectors 60 are each interspersed on opposite sides of electromagnetic plane 36. In the example illustrated, emitters 68 and detectors 60 alternate along each side of electromagnetic plane 36. Each emitter 68 is paired with a corresponding detector 60. In other implementations, emitters 68 and detectors 60 may have other arrangements or patterns along each side of electromagnetic plane 36. Different signals from different detectors 50 may indicate different crop flow (rate, volume or mass) through different portions or regions of electromagnetic plane 36. For example, signals from those detectors 60 proximate the left side of plane 36 as compared to signals from those detectors 60 proximate the right side of plane 36 may indicate different crop flow through the different regions, a different crop flow through the left region of plane 36 as compared to the right region of plane 36.

Figure 6:
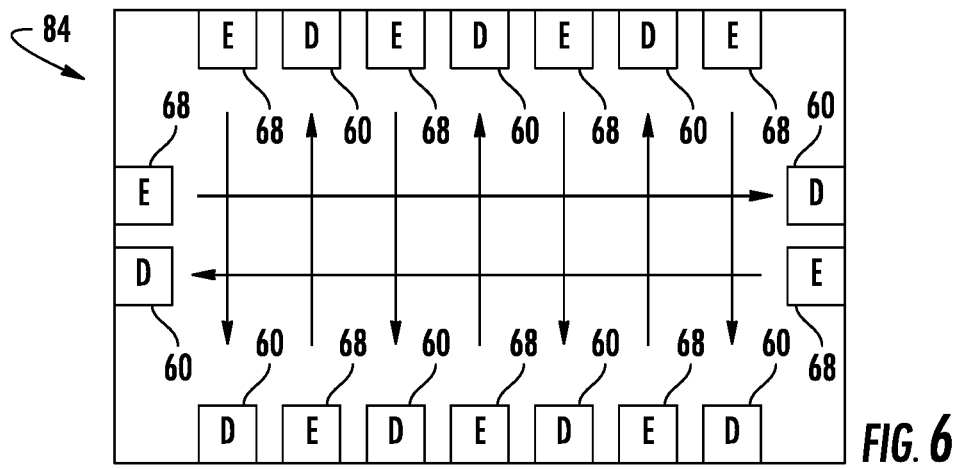
FIG. 6 is a top view of an example material flow sensor forming an example electromagnetic plane.

FIG. 6 illustrates material flow sensor 84. Material flow sensor 84 is similar to material flow sensor 74 except that material flow sensor 84 comprises additional emitters 68 and detectors 60 along opposite ends 93, 95 of the electromagnetic plane 36. In the example illustrated, and 93, 95 each include at least one emitter 68 and at least one corresponding detector 60. In other implementations, ends 93 and 95 may be provided with emitters and detectors similar to the provision of emitters and detectors with respect to sensor 44, sensor 54 or sensor 64. Because sensor 84 additionally comprises emitters and detectors on its ends 93 and 95, signals from such the detectors 60 on the opposite ends 93, 95 may indicate crop flow differences as between side 53 and side 55. Sensor 84 provides two-dimensional crop flow sensing, left to right and top to bottom sensing of crop flow through plane 36. As will be described hereafter, signals from detectors 60 in any of the aforementioned sensors indicating unbalanced crop material flow may be utilized to balance load upon the various components or stages of grain processing unit 30.

Figure 7:
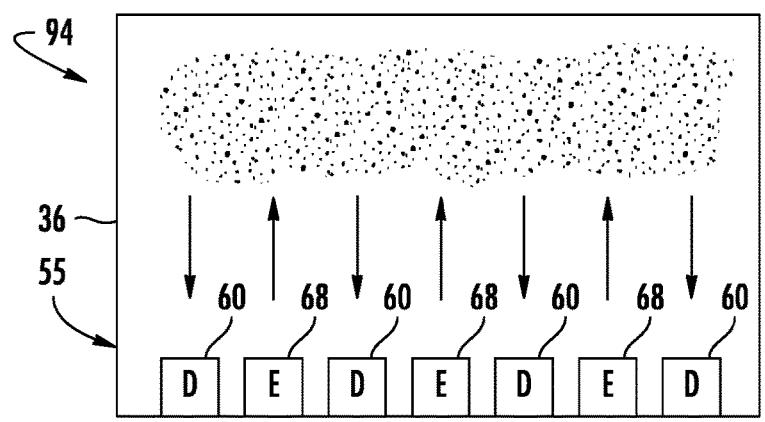
FIG. 7 is a top view of an example material flow sensor forming an example electromagnetic plane.

FIG. 7 illustrates material flow sensor 94. Material flow sensor 94 comprises individual emitters 58 and corresponding individual or discrete detectors 50. Material flow sensor 94 is similar to material flow sensor 74 except that emitters 58 and detectors 50 are each interspersed on one side of electromagnetic plane 36. In the example illustrated, emitters 68 and detectors 60 alternate along each side of electromagnetic plane 36. In other implementations, emitters 68 and detectors 60 may have other arrangements or patterns along each side of electromagnetic plane 36. With material flow sensor 94, the electromagnetic detectors 60 and electromagnetic emitters 58 detect or sense reflection or fringing fields of the electromagnetic radiation off of crop flow across plane 36. Different signals from different detectors 60 may indicate different crop flow (rate, volume or mass) through different portions or regions of electromagnetic plane 36. For example, signals from those detectors 60 proximate the left side of plane 36 as compared to signals from those detectors 60 proximate the right side of plane 36 may indicate different crop flow through the different regions, a different crop flow through the left region of plane 36 as compared to the right region of plane 36.

Figure 8:
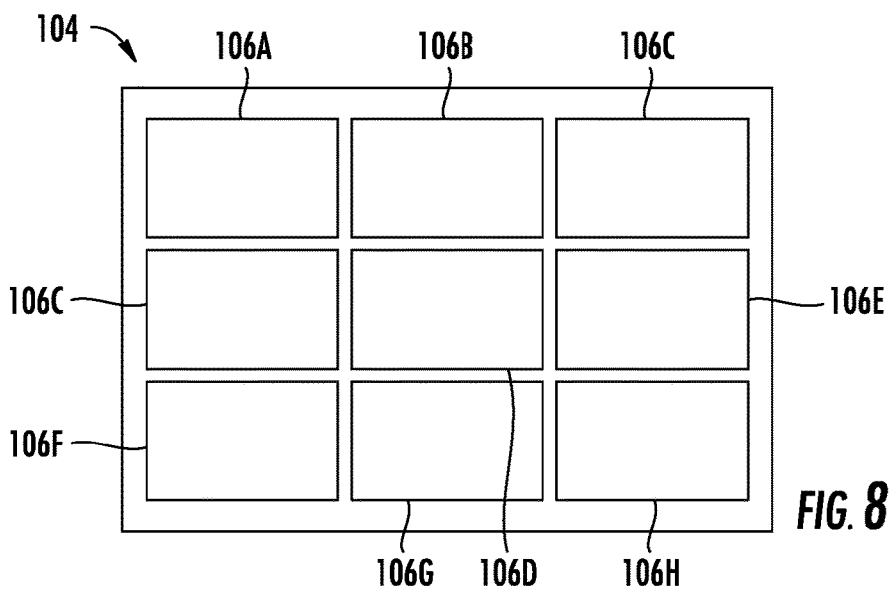
FIG. 8 is a top view of an example material flow sensor forming an array of electromagnetic field units forming an example electromagnetic plane.

FIG. 8 illustrates material flow sensor 104. Material flow sensor 104 comprises an electromagnetic plane formed by a two-dimensional array or grid of individual electromagnetic field and sensing units 106A, 106B, 106C, 106D, 106E, 106F, 106G and 106H (collectively referred to as units 106). Each of units 106 may have a configuration corresponding to any of the individual material flow sensors 44-94. Each unit 106 comprises at least one emitter and at least one detector extending along are adjacent a central opening through which crop material flows or passes. In one implementation, the different units 106 are positioned side-by-side adjacent one another. In yet another implementation, the different units 106 may be spaced from one another, wherein crop material flows through the different units 106 as well as between openings formed between consecutive units 106. In those implementations in which crop material flows through openings between consecutive units 106, crop material flow may be estimated based upon the relative locations and proportions of the sizes of the units 106 as compared to the size of the openings extending between consecutive units 106. In one implementation, the aggregate electromagnetic plane area has a dimension of at least 1 foot in a first dimension and 4 feet in a second dimension. In one implementation, the total of the individual areas of the units in the two-dimensional array have a dimension of at least 1 foot in a first dimension and 5 foot in the second dimension.

Although material flow sensor 104 is illustrated as comprising a 3×3 grid or array of uniformly sized units 106, in other implementations, material flow sensor 104 may comprise a 1×2 array of units 106, a 2×2 array of units 106 or other numbers of units 106 in either of the two dimensions. In other implementations, different units 106 of the array may be differently sized relative to one another. For example, in regions of the overall area of material flow sensor 106 in which a high-resolution of crop flow is desired, the units 106 may be smaller in size or may have a higher density as compared to the size or density of units 106 in other regions of the overall area of material flow sensor 106 where crop material flow is lower and/or where a high-resolution detection of crop flow is of less concern.

Figure 9:
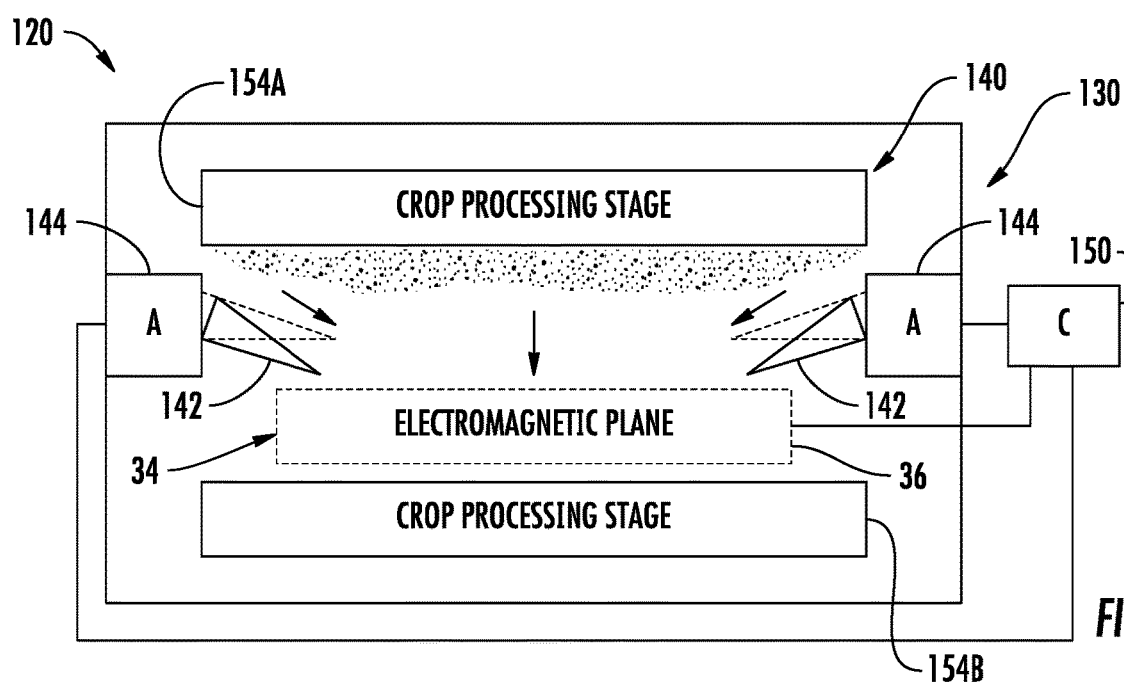
FIG. 9 is a schematic diagram of portions of an example harvester in a level orientation.
Figure 10:
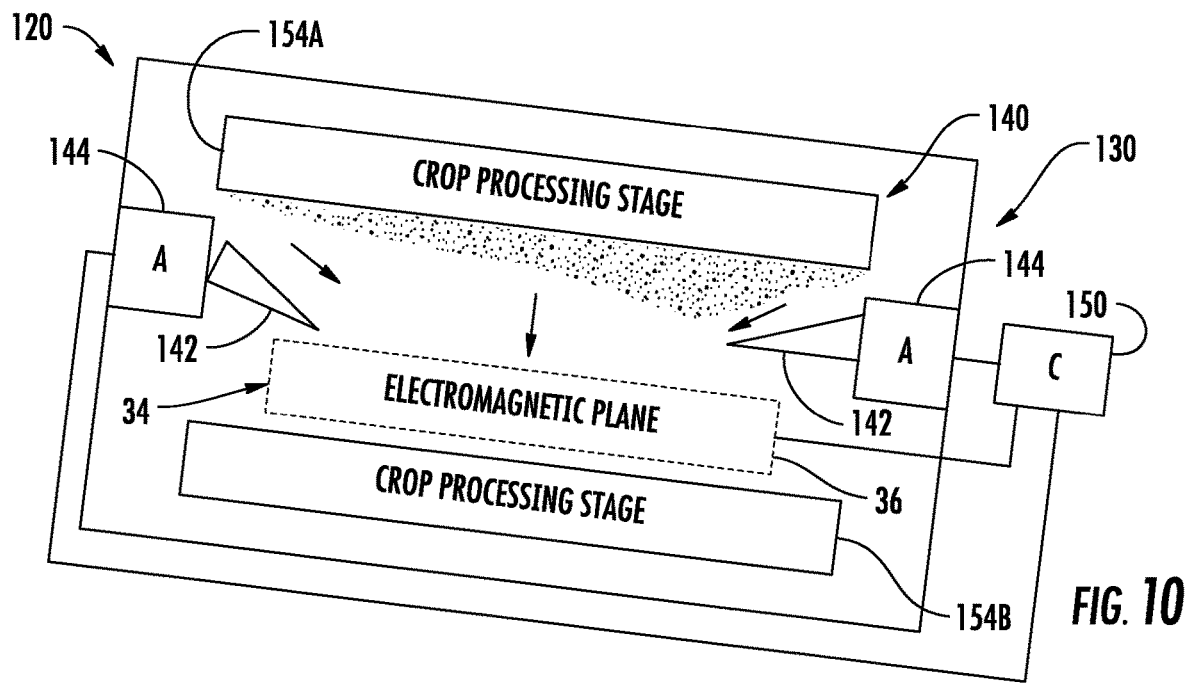
FIG. 10 is a schematic diagram of portions of the example harvester of FIG. 9 in a tilted orientation.

FIGS. 9 and 10 schematically illustrate portions of an example harvester 120 which comprises material flow sensor 34 which forms electromagnetic plane 36. Examples of the material flow sensor 34 and electromagnetic plane 36 are shown or described above with respect to FIGS. 2-6. In addition to material flow sensor 34, harvester 120 comprises a grain processing unit 130. Grain processing unit 130 comprises a set of harvester components that interact with the separated crop material and that separate the crop material into (A) grain, which is gathered in a grain tank, and (B) MOG which may be discharged from the harvester. Grain processing unit 130 comprises multistage separation unit 140, deflectors 142, actuators 144 and controller 150.

Multistage separation unit 140 comprises separate stages by which the crop material is further refined and separated into grain and MOG. Multistage separation unit 140 comprises crop separation or processing stages 154A, 154B. In one implementation, crop processing stage 154A filters crop material of a first size through stage 154A. Crop processing stage 154B filters crop material of a second size, smaller than the first size, through stage 154B. Crop processing stages 154A and 154B are consecutive with respect to one another, meaning that no other crop filtering or separation processes or stages are sandwiched between stages 154A and 154B.

In one implementation, crop processing stage 154A may comprise a grate or concave opposite a rotor while crop processing stage 154B may comprise a chaffer or upper sieve. In such an implementation, a pan may be provided between stages 154A and 154B, wherein the pan collects crop material that is passed through the greater concave and deposits the collected crop material onto the upper chaffer or upper sieve.

In another implementation, crop processing stage 154A may comprise a set of straw walkers while crop processing stage 154B comprises a chaffer or upper sieve. In yet another implementation come up crop processing stage 154A more may comprise a first chaffer or sieve (sometimes referred to as a separation frame) while crop processing stage 154B comprises a second underlying chaffer or sieve.

As shown by FIGS. 9 and 10, material flow sensor 34 is sandwiched between crop processing stages 154A and 154B. Material flow sensor 34 output signals indicating the flow of crop material from stage 154A and the flow of crop material about to enter crop processing stage 154B. As discussed above, in some implementations, material flow sensor 34 may indicate nonuniform crop flow through different regions or portions of the electromagnetic plane 36.

Deflectors 142 comprise baffles, panels or other crop flow directing structures that are sandwiched between stages 154A and 154B. Deflectors 142 selectively alter the direction of at least portions of the flow of crop material between stages 154A and 154B. In one implementation, deflectors 142 are pivotable (as shown in broken lines in FIG. 9) between different angular positions to adjust the direction of crop flow. In yet another implementation, deflectors 142 are further or alternatively translatable, being movable in and out with respect to electromagnetic plane 36.

Although deflectors 142 are illustrated as extending along to opposite ends of electromagnetic plane 36, deflectors 142 may additionally or alternatively extend along opposite sides of electromagnetic plane as well. Although grain processing unit 130 is illustrated as comprising two of such deflectors 142, in other implementations, grain processing unit 130 may comprise multiple grain deflectors 142 along each side or along each and of electromagnetic plane 36. In some implementations, grain processing unit 130 may comprise a deflector along only one end and/or along only one side of electromagnetic plane 36. Although deflectors 142 are illustrated as located above electromagnetic plane 36, between electromagnetic plane 36 and stage 154A, in other implementations, deflectors 142 may be located below electromagnetic plane 36, between electromagnetic plane 36 and stage 154B.

Actuators 144 comprise devices to selectively position or reposition deflectors 142. In one implementation, actuators 144 may each comprise pneumatically or hydraulically driven cylinder-piston assemblies, such as a pair of unidirectional assemblies or a bidirectional assembly. In yet another implementation, actuators 144 may each comprise an electric solenoid. In still other implementations, acted 144 may comprise other powered devices that rotate and/or translate deflectors 142.

Controller 150 comprises electronics or circuitry that outputs control signals to control actuators 144 based upon signals from the detectors 60 of sensor 34. In one implementation, controller 150 may comprise a processing unit that follows instructions stored on a non-transitory computer-readable medium. In one implementation, controller 150 may comprise an integrated circuit, such as an application-specific integrated circuit, that follows instructions in the form of logic elements. As will be described hereafter, in some implementations, controller 150 may comprise a processing unit that follows instructions stored on a non-transitory computer readable medium to additionally determine grain yield or and/or MOG yield based upon signals from sensor 34 indicating crop flow through electromagnetic plane 36.

As discussed above, material flow sensor 34 may output signals indicating uneven or non-uniform crop flow through different portions of electromagnetic plane 36. This may result in uneven loading of crop processing stage 154B. Controller 150 determine such an uneven crop flow based upon signals from detectors 60 of sensor 34 and outputs control signals causing actuator 144 to reposition or adjust the positioning of deflectors 142 to address the uneven crop flow to provide a more uniform or even flow of crop material to crop processing stage 154B. For example, upon determining that an excessive amount of crop flow may be occurring on the right side of electromagnetic plane 36, controller 150 may output control signals adjusting the position of actress 144 so as to bias crop flow towards the left side of electromagnetic plane 36, better evening out crop flow to crop processing stage 154B. In one implementation, the control signals may cause actuators 144 to pivot deflectors 142 to different positions with respect to one another. As a result, crop processing stage 154B expenses more even crop loading, increasing the rate or throughput capacity of harvester 120.

As shown by FIG. 10, as harvester 120 is traversing a field, harvester 120 may encounter uneven terrain. This may result in grain processing unit 130 being tilted to one side or the other. FIG. 10 illustrates a situation where grain processing unit 130 is tilted to the right. In such an implementation, absent further corrections, crop flow from stage 154A may be uneven, excessively loading the right side of crop processing stage 154B. The larger amount of crop material passing through the right side of electromagnetic plane 36 a material flow sensor 34 is reflected by the signals being output by sensor 34. Controller 150 compares signals from the different detectors 60 to identify the uneven crop flow. In response, controller 150 may output control signals causing actuators 144 to differently position deflectors 142 to provide a more even crop flow to stage 154B. In the example illustrated, the deflector 142 on the left side is angled more downwardly as compared to the deflector 142 on the right side.

In some circumstances, the harvester may be going uphill or downhill. Signals from sensor 34 (such as when sensor 34 comprises the example 84 of sensor 34 described above with respect to FIG. 6) may be utilized to identify uneven crop flow through electromagnetic plane 36 in the fore and aft directions. In such a circumstance, controller 150 may respond by outputting control signals causing deflectors 142 located on front and rear of electromagnetic plane 36 to be repositioned to provide more uniform crop flow to stage 154B.

Figure 11:
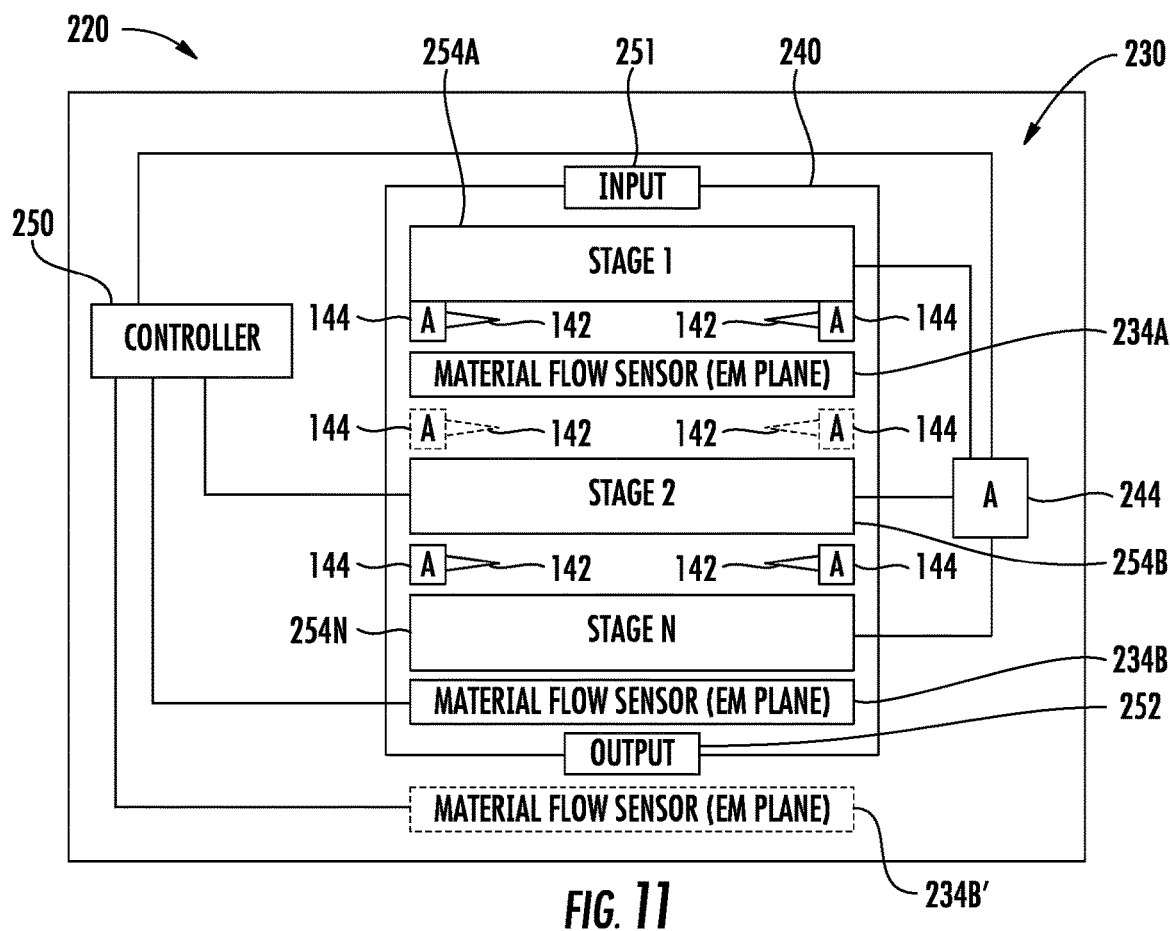
FIG. 11 is a schematic diagram of portions of an example harvester.

FIG. 11 schematically illustrates portions of an example harvester 220. Harvester 220 comprises grain processing unit 230 and material flow sensors 234A, 234B (collectively referred to as material flow sensors 234). Grain processing unit 230 comprises a set of harvester components that interact with the separated crop material and that separate the crop material into (A) grain, which is gathered in a grain tank, and (B) MOG which may be discharged from the harvester. Grain processing unit 230 comprises multistage separation unit 240, deflectors 142, actuators 144, actuators 244 and controller 250. Grain processing unit 230.

Multistage separation unit 240 comprises separate stages by which the crop material is further refined and separated into grain and MOG. Multistage separation unit 240 comprises input 251, output 252 and crop separation or processing stages 254A, 254B, . . . 254N (collectively referred to as crop processing stages 254). Input 251 comprises an entry point for multistage separation unit 240. In one implementation, input 251 receives crop material from a feeder house of harvester 220. Output 252 comprise a discharge point for MOG out of multistage separation unit 240. The crop material discharge output 252 may additionally include lost grain, grain that was not filtered through stages 254 and is undesirably discharged from harvester 220.

Crop processing stages 254 are arranged in a series between input 251 and output 252, wherein the series of crop processing stages 254 progressively filter out grain material from MOG. For example, crop processing stage 254A filters crop material of a first size through stage 254A. Crop processing stage 254B filters crop material of a second size, smaller than the first size, through stage 254B, and so on. Crop processing stages 254A and 254B are consecutive with respect to one another, meaning that no other crop filtering or separation processes or stages are sandwiched between stages 254A and 254B.

In one implementation, crop processing stage 254A may comprise a grate or concave opposite a rotor while crop processing stage 254B may comprise a chaffer or upper sieve. In such an implementation, a pan may be provided between stages 254A and 254B, wherein the pan collects crop material that is passed through the greater concave and deposits the collected crop material onto the upper chaffer or upper sieve.

In another implementation, crop processing stage 254A may comprise a transverse concave while crop processing stage 254B comprises a chaffer or upper sieve. In yet another implementation, crop processing stage 254A more may comprise a first chaffer or sieve (sometimes referred to as a separation frame) while crop processing stage 254B comprises a second underlying chaffer or sieve.

Material flow sensors 234 are similar material flow sensor 34 described above. Material flow sensors 234 may comprise one of the examples 44, 54, 64, 74 or 84 described above. Material flow sensor 234A is sandwiched between crop processing stages 254A and 254B. Material flow sensor 234A outputs signals indicating the flow of crop material from stage 254A and the flow of crop material about to enter crop processing stage 254B. Material flow sensor 234B outputs signals indicating the massive crop material exiting through output 252, the massive crop material that did not pass through the final crop processing filter or stage of multistage separation unit 240. In the example illustrated, material flow sensor 234B is located between the final crop processing stage 254N and output 252. As indicated by broken lines, in other implementations, harvester 220 may alternatively comprise a material flow sensor 234B' downstream of output 252. For example, material flow sensor 234B may extend across output 252 through which chaff and other MOG, that did not pass through crop processing stage 254N, is blown from a rear of the harvester 220.

Deflectors 142 and actuators 144 are described above respect to harvester 120. In the example illustrated, deflectors 142 and actuators 144 provided between stage 254A and material flow sensor 234A, and between stage 254B and a successive crop processing stage 254. As shown by broken lines, in some implementations, deflectors 142 and actuators 144 may alternatively or additionally be located between material flow sensor 234A and crop processing stage 254B. in some implementations, deflectors 142 and actuators 144 may be omitted or may have other locations.

Actuator 244 comprises at least one actuator operably coupled to crop processing stages 254 to adjust the tilt orientation of actuators 254 based upon signals received from at least one of material flow sensors 234.

Controller 250 is similar to controller 150 described above except that controller 250 outputs control signals for controlling the operation of actuators 144 and actuators 244. Controller 250 further determines or estimates grain yield based upon signals received from material flow sensors 234. In one implementation, controller 250 may comprise a processing unit that follows instructions stored on a non-transitory computer-readable medium. In one implementation, controller 250 may comprise an integrated circuit, such as an application-specific integrated circuit, that follows instructions in the form of logic elements.

As discussed above, in some circumstances, crop material may be flowing through multistage separation unit 240 in a nonuniform manner. For example, harvester 220 may be traversing the side of a hill, may be going uphill or downhill. In other examples the uneven crop flow may be related to crop type or to a crop condition such as wetness. The uneven flow of crop material may be sensed by at least one of material flow sensors 234. Material flow sensor 34 may indicate nonuniform crop flow through different regions or portions of the electromagnetic plane 36. Controller 250 identifies such uneven crop flow from the signals output by detectors 60 of the individual material flow sensors 234. For example, controller 250 may compare signals from one set of detectors 60 in one region or portion of the electromagnetic plane with the signals from another set of detectors 60 in another region or portion of the electromagnetic plane of the material flow sensor 234.

Upon determining an uneven crop flow, controller 250 may output control signals controlling or adjusting the operation of actuators 144 and 244. As discussed above, controller 250 may output control signals causing actuators 144 to selectively reposition a single deflector or multiple deflectors 142 to adjust the direction or redistribution of the crop material flow. In some implementations controller 250 may additionally or alternatively output control signals causing actuator 244 to adjust the positioning or tilt of at least one of crop processing stages 254. For example, the stroke of a separation frame, such as a chaffer or sieve, may be adjusted by adjusting a length of a crank arm (provided as an adjustable link or cylinder-piston assembly having an adjustable length) that provides reciprocation of the separation frame to adjust the angle or tilt of the separation frame (see co-pending U.S. patent application Ser. No. 15/844,522 (Atty. Dkt. No. P26664-US-PRI) filed on the same day herewith by Karthikeyan Narayanan et al. and entitled HARVESTER SEPARATION FRAME ORIENTATION ADJUSTMENT, the full disclosure of which is hereby incorporated by reference.

Controller 250 further determines or estimates grain yield and/or MOG yield based upon a combination of signals from the detector or detectors 60 from at least two different material flow sensors 234. In the example illustrated, controller 250 determines or estimates grain yield based upon signals from detectors 60 from (A) a material flow sensor 234 sandwiched between the first stage 254A and the final stage 254N of multistage separation unit 240 and (B) a material flow sensor 234B (or 234B'). For example, controller 250 may estimate grain yield by subtracting the material flow determined from signals from material flow sensor 234B from the material flow determined from signals from material flow sensor 234A. The use of material flow sensors 234 facilitates the sensing of crop flow at earlier stages in the processing of the crop, prior to the crop being separated and condensed or focused into a stream of substantially clean grain entering a grain tank of the harvester and prior to the crop being substantially reduced in volume after removal of most of the grain from the crop flow. As a result, grain yield measurements and biomass measurements may be estimated at earlier points in time, rather than simply prior to discharge into the grain tank. The earlier grain yield measurements and biomass measurements may facilitate more accurate mapping of yield to regions of a field for enhanced field management.

Figure 12:
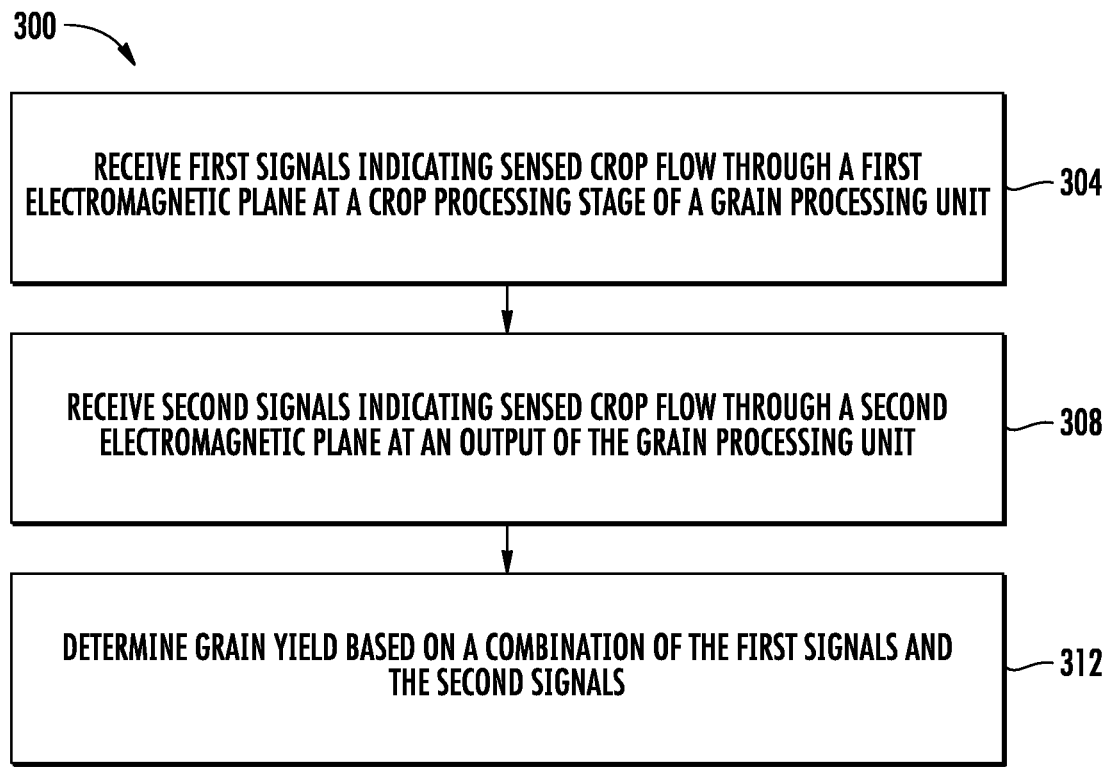
FIG. 12 is a flow diagram of an example method for determining grain yield with a harvester.

FIG. 12 is a flow diagram of an example method 300 that may be carried out to estimate or determine grain yield in a harvester. Method 300 facilitate earlier determination of grain yield, reducing yield estimation errors that may occur when such crop yield estimations are performed later in the processing of a crop by a harvester. For example, the conveyance of grain from one side of a harvester to another side of the harvester, after separation, may distort grain yield values. Although method 300 is described in the context of being carried out in harvester 220, it should be appreciated that method 300 may likewise be carried out in any of the subsequently described harvesters or in similar harvesters.

As indicated by block 304, controller 250 receives first signals from material flow sensor 234A indicating sensed crop flow through an electromagnetic plane 36 (shown in FIGS. 2-8) at a crop processing stage 254A of a grain processing unit 230. Although controller 250 utilizes signals from material flow sensor 234A at a crop processing stage 254A immediately adjacent input 251 to facilitate yield estimation at an earlier time, controller 250 may alternatively utilize signals from a different material flow sensor sandwiched between input 251 and the final crop processing stage 254N.

As indicated by block 308, controller 250 receives second signals from material flow sensor 234B (or material flow sensor 234B') indicating sensed crop flow through an output to 52 of the grain processing unit 230. As indicated by block 312, controller 250 determines or estimates a grain yield based upon a combination of the first signals and the second signals. In one implementation, controller 250 subtracts the sensed crop flow indicated by the second signals from the sensed crop flow indicated by the first signals to arrive at a grain yield estimate.

In one implementation, controller 250 takes into account the time for the crop material to pass from the first electromagnetic plane to the second electromagnetic plane. For example, controller 250 may determine grain yield at a particular harvesting moment or for a particular geo-referenced region of a field based upon signals from material flow sensor 234A at a first point in time and based upon signals from material flow sensor 234B at a second later point in time, the second later point in time following the first point in time by an amount of time corresponding to the time for the crop material to flow or otherwise move from material flow sensor 234A to material flow sensor 234B.

Figure 13:
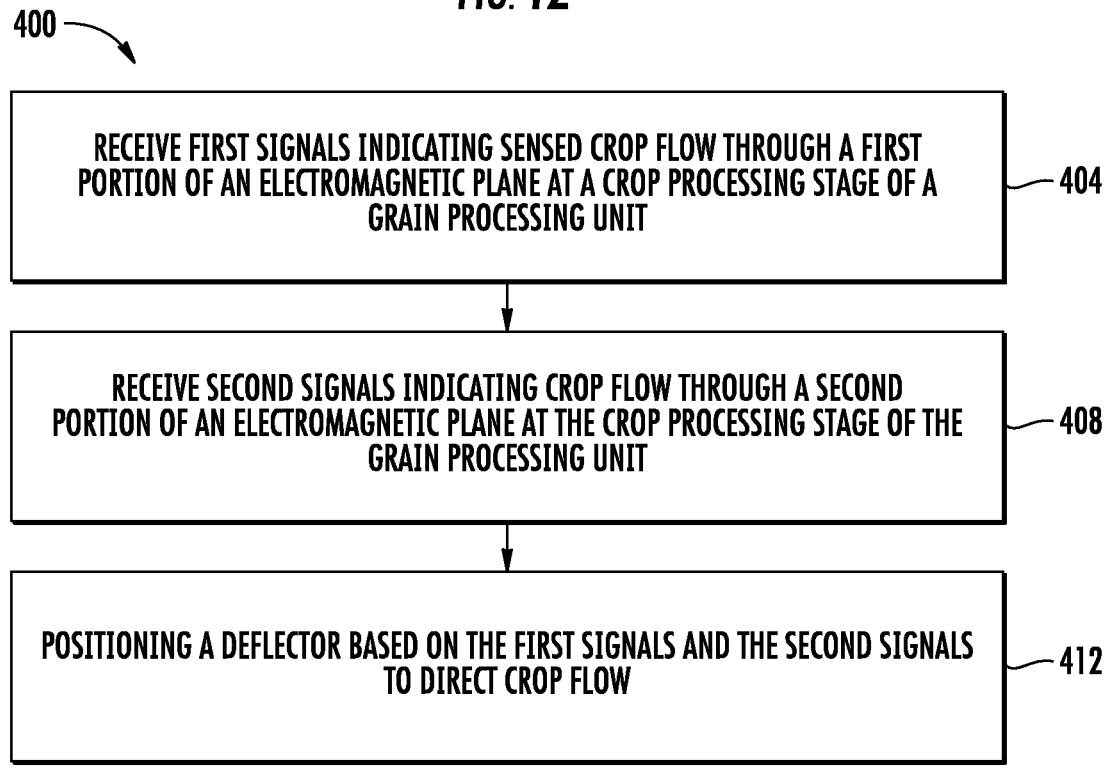
FIG. 13 is a flow diagram of an example method for adjusting operational parameters of a harvester.

FIG. 13 is a flow diagram of an example method 400 for controlling operational parameters of a harvester. Method 400 facilitates the identification of non-uniform crop flow and the automated adjustment of harvester operational parameters to address such non-uniform crop flow and inhibit overloading of selected crop processing stages of a harvester. Although method 400 is described in the context of being carried out in harvester 220, it should be appreciated that method 300 may likewise be carried out in any of the subsequently described harvesters or in similar harvesters.

As indicated by block 404, controller 250 may receive first signals indicating sensed crop flow through the first portion of an electromagnetic plane at a crop processing stage of a grain processing unit. For example, controller 250 may receive first signals from a first group of detectors 60 in a first portion, such as the left half, of an electromagnetic plane 36.

As indicated by block 408, controller 250 may receive second signals indicating crop flow through a second portion of the electromagnetic plane at the crop processing stage of the grain processing unit. For example, controller 250 may receive second signals from a second group of detectors 60 and a second portion, such as the right half, of an electromagnetic plane 36.

As indicated by block 412, controller 250 may output control signals positioning a deflector 142, or multiple deflectors 142, based upon the first signals and the second signals so as to direct crop flow. Controller 250 may output control signals causing actuators 144 to position their respective deflectors 142. For example, upon receiving signals indicating an uneven crop flow through the left half of the electromagnetic plane, controller 250 may output control signals positioning deflectors 142 such that deflectors 142 bias the flow of crop material towards the right half of the electromagnetic plane. As a result, signals from the electromagnetic plane are utilized to balance the crop flow through or across different crop processing stages of a harvester to more evenly load such stages and maintain or enhance crop harvesting capacity or throughput of the harvester.

Figure 14:
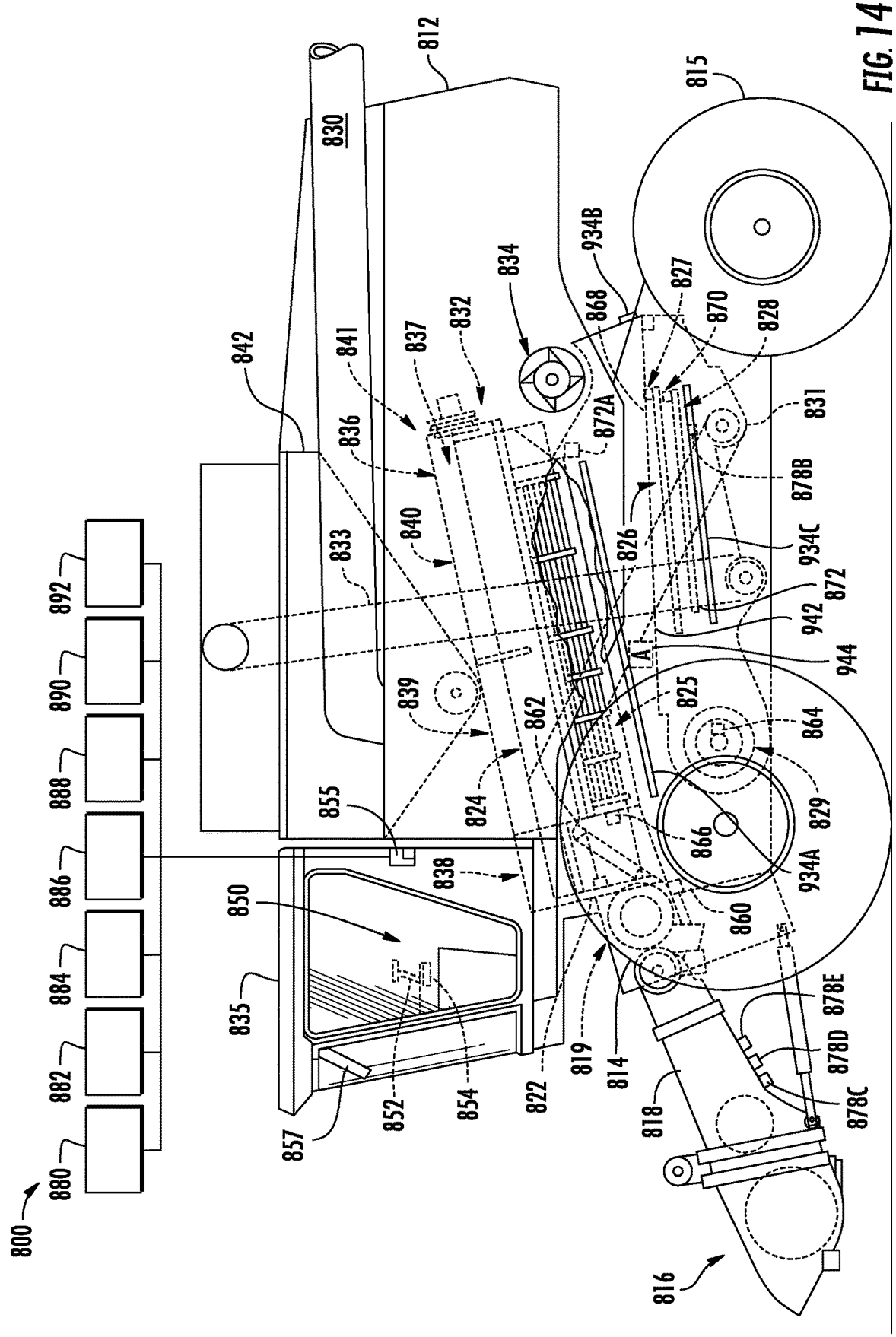
FIG. 14 is a diagram of portions of an example harvester.

FIG. 14 is a diagram of an example harvester 800, including the above-described material flow sensors. As shown by FIG. 14, harvester 800 comprises a main frame 812 having wheel structure including front and rear ground engaging wheels 814 and 815 supporting the main frame for forward movement over a field of crop to be harvested. The front wheels 814 are driven by an electronically controlled hydrostatic transmission.

A vertically adjustable header or harvesting platform 816 is used for harvesting a crop and directing it to a feeder house 818. The feeder house 818 is pivotally connected to the frame 812 and includes a conveyor for conveying the harvested crop to a beater 819. The beater 819 directs the crop upwardly through an inlet transition section 822 to a rotary threshing and separating assembly 824. In other implementations, other orientations and types of threshing structures and other types of headers 816, such as transverse frame supporting individual row units, are utilized.

The rotary threshing and separating assembly 824 threshes and separates the harvested crop material. Grain and chaff fall through separation grates of a concave 825 on the bottom of the assembly 824 to a cleaning system 826, and are cleaned by a chaffer 827 and a sieve 828 and air fan 829. The cleaning system 826 removes the chaff and directs the clean grain to elevator 833. Clean grain elevator 833 conveys the grain to grain tank 842. The clean grain in the tank 842 can be unloaded into a grain cart or truck by unloading auger 830. Tailings fall into the return elevator or auger 831 and are conveyed to the rotor 837 where they are threshed a second time.

Threshed and separated straw is discharged from the rotary threshing and separating assembly 824 through an outlet 832 to a discharge beater 834. The discharge beater 834, in turn, propels the straw out the rear of the combine. It should be noted that the discharge beater 834 could also discharge crop material other than grain directly to a straw chopper. The operation of the combine is controlled from an operator's cab 835.

In the example illustrated, the rotary threshing and separating assembly 824 comprises a cylindrical rotor housing 836 and a rotor 837 located inside the housing 836. The front part of the rotor and the rotor housing define the infeed section 838. Downstream from the infeed section 838 are the threshing section 839, the separating section 840 and the discharge section 841. The rotor 837 in the infeed section 838 is provided with a conical rotor drum having helical infeed elements for engaging harvested crop material received from the beater 819 and inlet transition section 822.

In the threshing section 839, the rotor 837 comprises a cylindrical rotor drum having a number of threshing elements for threshing the harvested crop material received from the infeed section 838. Downstream from the threshing section 839 is the separating section 840 wherein the grain trapped in the threshed crop material is released and falls to the cleaning system 828.

An operator's console 850 located in the cab 835 includes conventional operator controls including a hydro shift lever 852 for manually controlling the speed range and output speed of the hydrostatic transmission. An operator interface device 854 in the cab 835 allows entry of information into a controller 855 comprising an on-board processor system, which provides automatic speed control and numerous other control functions described below for the harvester 800. The operator can enter various types of information into the operator interface device 854, including crop type, location, yield and the like. In the example illustrated, combine harvester 800 additionally comprises display 857 for presenting information to the operator. In some implementations, display 857 may additionally serve as an input device, such as when display 857 comprises a touch screen. In other implementations, display 857 may be combined with interface device 854.

Figure 15:
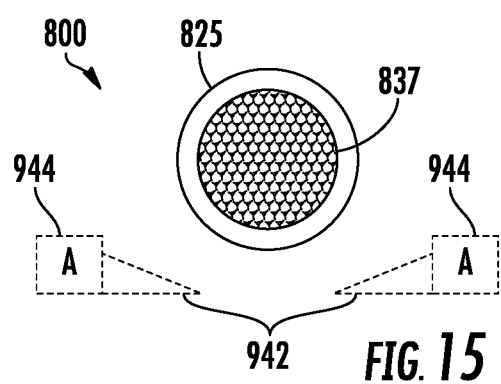
FIG. 15 is an end schematic diagram of portions of the example harvester of FIG. 14.

As further shown by FIG. 15, harvester 800 additionally comprises material flow sensors 934A, 934B and 934C (collectively referred to as material flow sensors 934), deflectors 942 and actuators 944. Material flow sensors 934 are each individually similar to material flow sensor 34 described above. Each of material flow sensor 934 may have an emitter-detector arrangement such as described above respect to FIG. 2, FIG. 3, FIG. 4, FIG. 5, FIG. 6, FIG. 7 or FIG. 8. Each of material flow sensors 934 have at least one detector 60 that outputs signals to controller 855 indicating crop flow through the electromagnetic plane of the material flow sensor 934.

Material flow sensor 934A is sandwiched between consecutive crop processing stages. In the example illustrated, grates 825 form a first crop processing stage, chaffer 827 forms a second consecutive crop processing stage and the individual sieve frames 828 form additional subsequent crop processing stages of a multistage separation unit that progressively filters and separates grain from MOG. Rotor 837 and grates 825 receive crop material through an input in the form of inlet 822. In the example illustrated, material flow sensor 934A is sandwiched between grates 825 and chaffer 827. Material flow sensor 934A forms an electromagnetic plane 36 and comprises detectors 60 (shown and described above with respect to FIGS. 3-6) that output signals indicating the flow of crop material from grates 825, through the electromagnetic plane 36 and about to be deposited upon crop chaffer 827.

Material flow sensor 934B forms and electromagnetic plane that extends across and output or outlet of the grain processing unit formed by the multistage separation unit. Material flow sensor 934B forms electromagnetic plane through which crop material remaining after such separation is discharged, generally at the rear of harvester 800 by beater 834. Material flow sensor 934B comprise detectors 60 that output signals to controller 855 indicating crop flow through or across material flow sensor 934B, a crop flow largely consisting of crop material blown by blower 864 off of the final separation frames such as sieves 828 and/or chaffer 827.

Material flow sensor 934C forms an electromagnetic plane 36 (shown in FIGS. 2-8) that extends below a final stage, a final sieve 872 of sieves 828, between the final sieve 872 and a second outlet of the multistage separation unit through which clean grain passes. Material flow sensor 934C senses the mass of material, predominately clean grain, falling to elevator 833 and tailings elevator 831. Signals from detectors 60 of material flow sensor 934C are transmitted to controller 855 to further assist in the determination of grain yield. For example, signals from material flow sensor 934C may be compared to signals from material flow sensors 934A and 934B to confirm a grain yield estimate.

Deflectors 942 and actuators 944 are similar to deflectors 142 and 144 described above respect to harvester 120. FIG. 13 illustrates deflectors 942 and actuators 944 in greater detail. As schematically shown by FIG. 14, deflectors 942 are located between grates 825 and chaffer 827, between material flow sensor 934A and chaffer 827. As shown by FIG. 15, Deflectors 142 and actuators 144 extend below opposite sides of rotor 837 and grates 825. Pivoting of deflectors 142 by actuators 144 adjust a degree to which crop material passing through grates 825 is directed to the left or to the right of grates 825 as seen in FIG. 15.

Controller 855 is similar to controller 250 described above. Controller 855 receive signals from the detector 60 of each of material flow sensors 934. Based upon such signals, controller 55 may carry out method 300 and method 400 described above. With respect to method 300, controller 855 may determine or estimate grain yield based upon signals received from material flow sensors 934. In one implementation, controller 855 may determine grain yield from material flow sensor 934A and 934B, such as by subtracting the material floor mass of material passing through the electromagnetic plane 36 of material flow sensor 934B from the material flow or mass of material passing through the electromagnetic plane of material flow sensor 934A.

In yet other implementations, controller 855 may determine or estimate grain yield (or other value such as MOG yield) using or based upon signals from additional material flow sensors 934, such as material flow sensor 934C. The use of material flow sensors 934 facilitates the sensing of crop flow at earlier stages in the processing of the crop, prior to the crop being separated and condensed or focused into a stream of substantially clean grain entering a grain tank of the harvester and prior to the crop being substantially reduced in volume after removal of most of the grain from the crop flow. As a result, grain yield measurements and biomass measurements may be estimated at earlier points in time, rather than simply prior to discharge into the grain tank. The earlier grain yield measurements and biomass measurements may facilitate more accurate mapping of yield to regions of a field for enhanced field management.

As discussed above, in some circumstances, crop material may be flowing through one or more of the different crop processing stages of harvester 800 in a nonuniform manner. For example, harvester 800 may be traversing the side of a hill, may be going uphill or downhill. The uneven flow of crop material may be sensed by at least one of material flow sensors 934. Material flow sensors 934 may indicate nonuniform crop flow through different regions or portions of the electromagnetic plane 36. Controller 855 identifies such uneven crop flow from the signals output by detectors 60 of the individual material flow sensors 934. For example, controller 855 may compare signals from one set of detectors 60 in one region or portion of the electromagnetic plane 36 of material flow sensor 934A with the signals from another set of detectors 60 in another region or portion of the electromagnetic plane 36 of the individual material flow sensor 934A.

Upon determining an uneven crop flow, controller 855 may output control signals controlling or adjusting the operation of actuators 944. As discussed above, controller 855 may output control signals causing actuators 944 to selectively reposition a single deflector or multiple deflectors 942 to adjust the direction of the crop material flow. In some implementations controller 855 may additionally or alternatively output control signals causing an actuator to adjust the positioning or tilt of at least one of crop separation frames, such as individual chaffer frames 827 or individual sieve frames 828. For example, the stroke of a separation frame, such as a chaffer or sieve, may be adjusted by adjusting a length of a crank arm (provided as an adjustable link or cylinder-piston assembly having an adjustable length) that provides reciprocation of the separation frame to adjust the angle or tilt of the separation frame (see co-pending U.S. patent application Ser. No. 15,844,522 (Atty. Dkt. No. P26664-US-PRI) filed on the same day herewith by Karthikeyan Narayanan et al. and entitled HARVESTER SEPARATION FRAME ORIENTATION ADJUSTMENT, the full disclosure of which is hereby incorporated by reference.

Controller 855 sees multiple signals from sensors throughout harvester 800. Signals from the sensors include information on environmental variables such as relative humidity, and information on variables controlled by the on-board control system. Signals include vehicle speed signals from a radar sensor or other conventional ground speed transducer 860, rotor and fan speed signals from transducers 862 and 864, and concave clearance and chaffer and sieve opening signals from transducers 866, 868 and 870, respectively. Signals from a grain moisture sensor 878A, a tailings volume sensor 878B, and relative humidity, temperature and material moisture sensors 878C, 878D and 878E are also provided.

A bus directs signals from the mentioned sensors and an engine speed monitor, a grain mass flow monitor, and other microcontrollers on the harvester to the controller 855. Signals from the operator interface 854 are also directed to the controller 855. The controller 855 is connected to actuators for controlling adjustable elements on the harvester. Feedback signals from the actuators are input to the controller 855.

The actuators controlled by the controller 855 comprise an actuator 880 controlling the rotational speed of the rotary threshing and separating assembly 824, an actuator 882 controlling the clearance of the concave 825, an actuator 884 controlling the opening of a pre-cleaner of the chaffer 827, an actuator 886 controlling the opening width of the chaffer 827, an actuator 888 controlling the opening of the sieve 828, an actuator 890 controlling the speed of the air fan 829, and an actuator 892 controlling the output speed of the hydrostatic transmission and thus the ground speed of the combine. These actuators are known in the art and thus only schematically indicated in FIG. 15. In some implementations, controller 855 may adjust the operational parameters of harvester 800 based upon the determined grain mass flow or grain yield (determined based upon signals from material flow sensor 934) by outputting control signals to one or more of actuators 880-892.

FIG. 16 is a diagram of an example harvester 1000, including the above-described material flow sensors. As shown by FIG. 16, harvester 1000 comprises chassis 1012 and ground engaging wheels 1014 and 1016. Forward ground engaging wheels 1014 are driven by hydraulic motor 1018 located between the wheels. Harvesting platform 1022 extends forwardly from the chassis of the combine and is used for harvesting a crop in a field. After harvesting, the crop is then directed through feeder house 1024 and into the harvester. Clean grain compartment or tank 1026 is located behind the operator's cab 1020 at the top of the harvester. Behind compartment 1026 is transverse internal combustion engine 1028 which is the prime mover of the combine and its various components. The internal combustion engine 1028 is provided with a transmission 1029 for powering the various usage assemblies.

Between the sides of the combine, which form the chassis of the combine, is located the grain processing unit 1030. The grain processing unit 1030 separates the grain from the straw and chaff of the harvested crop. The feeder house 1024 directs the harvested grain to grain processing unit 1030 which comprises a multistage separation unit comprising multiple stages that progressively filter in separate grain from material other than grain. Grain processing unit 1030 comprises different grain processing stages. Grain processing unit 1030 comprises a first grain processing stage formed by a rotating transverse threshing cylinder 1032, transverse concave 1034, and rotating beater 1038. As the crop passes between cylinder 1032 and concave 1034, grain and chaff fall through the concave to pan 1036 and the remaining straw and unseparated grain is advanced to beater 1038.

After threshing, the straw in the crop is advanced to straw walkers 1040, and cleaning shoe assembly 1048. From beater 1038 the crop is advanced to the oscillating straw walkers 1040 which direct the straw to the rear of the combine where it is returned to the field by straw spreader 1044. Grain and chaff falling through the straw walkers falls onto oscillating slanted pan 1046 which directs the grain and chaff to pan 1036. The grain and chaff are directed from pan 1036 by overhead auger assemblies to cleaning shoe assembly 1048 which is used to separate the chaff from the grain. The grain and chaff falling onto the different grain separation frames (chaffers or sieves) of the cleaning shoe assembly 1048 encounters an air stream from fan 1050 which blows the lighter chaff out of the rear of the combine while the heavier grain falls through the cleaning shoe assembly and into clean grain receiving auger 1052.

Auger 1052 directs the clean grain to a clean grain elevator (not shown) which in turn directs the grain to clean grain compartment or tank 1026. Tailings, that is unthreshed heads of grain, fall into tailings auger 1054 which directs the unthreshed heads back to the threshing cylinder and concave. When the clean grain compartment is to be unloaded, transverse unloading augers 1056 direct the grain to the side of the compartment from where it comes into contact with a vertical unloading auger (not shown) which directs the clean grain through unloading tube 1058. During an unloading operation, tube 1058 would normally be extended outwardly from the side of the combine so that clean grain can be more readily directed into a wagon or truck.

The cleaner assembly 1048 is equipped with three sieving surfaces. The upper surface, or chaffer 1047, is adjusted to retain the large pieces of material other than grain, "MOG", while allowing the grain and small pieces of chaff to pass through. The sieve 1049 is located under the chaffer 1047. The sieve 1049 is adjusted to remove the small pieces of chaff, while allowing the cleaned grain to pass through. Each of these sieving surfaces is composed of adjustable louvers (not shown). A combination of louver openings and fan speed is used to clean the grain with a minimum of grain loss.

As further shown by FIG. 16, harvester 1000 additionally comprises material flow sensors 1134A, 1134B and 1134C (collectively referred to as material flow sensors 1134), deflectors 1142 and actuators 1144. Material flow sensors 1134 are each individually similar to material flow sensor 34 described above. Each of material flow sensor 1134 may have an emitter-detector arrangement such as described above respect to FIG. 2, FIG. 3, FIG. 4, FIG. 5, FIG. 6, FIG. 7 or FIG. 8. Each of material flow sensors 934 have at least one detector 60 that outputs signals to controller 855 (described above) indicating crop flow through the electromagnetic plane of the material flow sensor 1134.

Material flow sensor 1134A is sandwiched between consecutive crop processing stages. In the example illustrated, concave 1034 forms a first crop processing stage, chaffer 1047 forms a second consecutive crop processing stage and the individual sieve frames 1048 form additional subsequent crop processing stages of a multistage separation unit that progressively filters and separates grain from MOG. Threshing cylinder 1032 and transverse concave 1034 receive crop material through an input from feeder house 1024. In the example illustrated, material flow sensor 1134A is sandwiched between concave 1034 and chaffer 1027. Material flow sensor 1134A forms an electromagnetic plane 36 and comprises detectors 60 (shown and described above with respect to FIGS. 2-8) that output signals indicating the flow of crop material from concave 1034, through the electromagnetic plane 36 and about to be deposited upon crop chaffer 1027.

Material flow sensor 1134B forms and electromagnetic plane that extends across and output or outlet of the grain processing unit formed by the multistage separation unit. Material flow sensor 1134B forms electromagnetic plane through which crop material remaining after such separation is discharged, generally at the rear of harvester 1000. Material flow sensor 1134B comprise detectors 60 that output signals to controller 855 indicating crop flow through or across material flow sensor 1134B after the crop flow has passed through each of the stages of the multistage separation unit.

Material flow sensor 1134C forms an electromagnetic plane 36 (shown in FIGS. 2-8) that extends below a final stage, a final sieve 1049, between the final sieve 1049 and a second outlet of the multistage separation unit through which clean grain passes. Material flow sensor 1034C senses the mass of material, predominately clean grain, falling to elevator 1052 and tailings elevator 1054. Signals from detectors 60 of material flow sensor 1134C are transmitted to controller 855 to further assist in the determination of grain yield. For example, signals from material flow sensor 1134C may be compared to signals from material flow sensors 1134A and 1134B to confirm a grain yield estimate.

Deflectors 1142 and actuators 1144 are similar to deflectors 142 and 144 described above respect to harvester 120. As schematically shown by FIG. 14, deflectors 1142 are located between concave 1034 and chaffer 1027, between material flow sensor 1134A and chaffer 1047. Pivoting of deflectors 1142 by actuators 1144 adjust a degree to which crop material passing through concave 1034 is transversely directed to the left or to the right of concave 1034.

Controller 855 is similar to controller 250 described above. Controller 855 receives signals from the detector 60 of each of material flow sensors 1134. Based upon such signals, controller 855 may carry out method 300 and method 400 described above. With respect to method 300, controller 855 may determine or estimate grain yield based upon signals received from material flow sensors 1134. In one implementation, controller 855 may determine grain yield from a combination of signals from both material flow sensors 1134A and 1134B, such as by subtracting the mass of material passing through the electromagnetic plane 36 of material flow sensor 11346 from the material flow or mass of material passing through the electromagnetic plane of material flow sensor 1134A.

In yet other implementations, controller 855 may determine or estimate grain yield (or other value such as MOG yield) using or based upon signals from additional material flow sensors 1134, such as material flow sensor 1134C. The use of material flow sensors 1134 facilitates the sensing of crop flow at earlier stages in the processing of the crop, prior to the crop being separated and condensed or focused into a stream of substantially clean grain entering a grain tank of the harvester and prior to the crop being substantially reduced in volume after removal of most of the grain from the crop flow. As a result, grain yield measurements and biomass measurements may be estimated at earlier points in time, rather than simply prior to discharge into the grain tank. The earlier grain yield measurements and biomass measurements may facilitate more accurate mapping of yield to regions of a field for enhanced field management.

As discussed above, in some circumstances, crop material may be flowing through one or more of the different crop processing stages of harvester 1000 in a nonuniform manner. For example, harvester 1000 may be traversing the side of a hill, may be going uphill or downhill. The uneven flow of crop material may be sensed by at least one of material flow sensors 1134. Material flow sensors 1134 may indicate nonuniform crop flow through different regions or portions of the electromagnetic plane 36. Controller 855 identifies such uneven crop flow from the signals output by detectors 60 of the individual material flow sensors 1134. For example, controller 855 may compare signals from one set of detectors 60 in one region or portion of the electromagnetic plane 36 of material flow sensor 1134A with the signals from another set of detectors 60 in another region or portion of the electromagnetic plane 36 of the individual material flow sensor 1134A.

Upon determining an uneven crop flow, controller 855 may output control signals controlling or adjusting the operation of actuators 1144. As discussed above, controller 855 may output control signals causing actuators 1144 to selectively reposition a single deflector or multiple deflectors 1142 to adjust the direction of the crop material flow. In some implementations controller 855 may additionally or alternatively output control signals causing an actuator to adjust the positioning or tilt of at least one of crop separation frames, such as individual chaffer frames 1047 or individual sieve frames 1048. For example, the stroke of a separation frame, such as a chaffer or sieve, may be adjusted by adjusting a length of a crank arm (provided as an adjustable link or cylinder-piston assembly having an adjustable length) that provides reciprocation of the separation frame to adjust the angle or tilt of the separation frame (see co-pending U.S. patent application Ser. No. 15,844,522 (Atty. Dkt. No. P26664-US-PRI) filed on the same day herewith by Karthikeyan Narayanan et al. and entitled HARVESTER SEPARATION FRAME ORIENTATION ADJUSTMENT, the full disclosure of which is hereby incorporated by reference.

Controller 855 sees multiple signals from sensors throughout harvester 1000. Signals from the sensors include information on environmental variables such as relative humidity, and information on variables controlled by the on-board control system. Signals include vehicle speed signals from a radar sensor or other conventional ground speed transducer, rotor and fan speed signals, and concave clearance and chaffer and sieve opening signals. In some implementations, controller 855 may adjust the operational parameters of harvester 1000 based upon the determined grain mass flow or grain yield (determined based upon signals from material flow sensor 934). For example, controller 55 may output control signals adjusting the clearance between cylinder 102 and concave 1034, adjusting the reciprocation frequency of straw walkers 1040, or adjusting the position of the louver's associated with chaffer 1047 or sieves 1049.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A harvester comprising:
   a grain processing unit; and
   a material flow sensor comprising at least one electromagnetic field unit comprising that is to form at least one electromagnetic field through which crop material passes while being sensed, the at least one electromagnetic field having an area of at least 4 ft.$^2$, wherein the material flow sensor comprises:
- at least one electromagnetic emitter;
- first detectors forming a first portion of the at least one electromagnetic field proximate a first side of the harvester; and
- second detectors forming a second portion of the at least one electromagnetic field proximate a second side of the harvester,
- a controller to output control signals based upon a difference between signals from the first detectors and signals from the second detectors;
- at least one movable material flow deflector; and
- at least one actuator, wherein the at least one actuator moves the at least one movable material flow deflector in response to the control signals.

2. The harvester of claim 1, wherein the material flow sensor comprises at least one electromagnetic emitter and a series of electromagnetic detectors.

3. The harvester of claim 1, wherein the grain processing unit comprises a multistage separation unit to separate grain from crop material other than grain, wherein the electromagnetic field is sandwiched between consecutive stages of the separation unit.

4. The harvester of claim 3, wherein the multistage separation unit comprises a first stage comprising a concave and a second stage comprising a sieve, wherein the sensor extends between the first stage and the second stage such that a material stream exiting the concave passes through the material flow sensor prior to reaching the sieve.

5. The harvester of claim 3 further comprising:
- a second material flow sensor across an outlet of the multistage separation unit; and
- a processing unit to determine a grain yield based upon a combination of signals from the material flow sensor and the second material flow sensor.

6. The harvester of claim 5, wherein the harvester comprises a shoe providing the outlet.

7. The harvester of claim 3, wherein the multistage separation unit comprises straw walkers.

8. The harvester of claim 1, wherein the at least one movable material flow deflector is movable to alter a path of the crop material through the at least one electromagnetic field.

9. The harvester of claim 1, wherein the control signals are to move the at least one movable material flow deflector to alter a horizontal transverse direction of material flow between the first side and the second side of the harvester.

10. The harvester of claim 1 further comprising:
- a feeder house to convey crop material;
- a grain holding tank;
- at least one auger to convey grain, separated from the crop material, to the holding tank,
- wherein the grain processing unit comprises a multistage separation unit to separate grain from crop material other than grain, the multistage separation unit comprising:
  - an inlet to directly receive the crop material from the feeder house;
  - a first outlet region through which the grain separated from the crop material is directly discharged to the auger; and
  - a second outlet region through which crop material not directed through the first outlet region is discharged from the multistage separation unit, wherein the at least one electromagnetic field extends across at least one of the first outlet region and the second outlet region.

11. The harvester of claim 10, wherein the multistage separation unit comprises a series of sieves including a final sieve, wherein the at least one electromagnetic field extends immediately adjacent the final sieve, between the final sieve and the auger.

12. The harvester of claim 10, wherein the at least one electromagnetic field extends across the second outlet region.

13. The harvester of claim 12 further comprising a processing unit, wherein the processing unit is to determine grain content in material flow through the at least one electromagnetic field based upon signals from the at least one electromagnetic field of the material flow sensor.

14. The harvester of claim 13 further comprising a second material flow sensor to form a second electromagnetic plane that extends across the first outlet region and through which grain passes while being sensed.

15. A harvester comprising:
- a feeder house to convey crop material;
- a grain holding tank;
- at least one auger to convey grain, separated from the crop material, to the holding tank;
- a multistage separation unit to separate grain from crop material other than grain, the multistage separation unit comprising:
  - an inlet to directly receive the crop material from the feeder house;
  - a first outlet region through which the grain separated from the crop material is directly discharged to the auger; and
  - a second outlet region through which crop material not directed through the first outlet region is discharged from the multistage separation unit;
- at least one electromagnetic field unit forming a sensing plane across at least one of the first outlet region and the second outlet, wherein the at least one electromagnetic field unit comprises an electromagnetic field unit that comprises:
  - at least one electromagnetic emitter;
  - first detectors forming a first portion of the sensing plane proximate a first side of the harvester; and
  - second detectors forming a second portion of the sensing plane proximate a second side of the harvester;
- a controller to output control signals based upon a difference between signals from the first detectors and signals from the second detectors;
- at least one movable material flow deflector; and
- at least one actuator, wherein the at least one actuator moves the at least one movable material flow deflector in response to the control signals.

16. The harvester of claim 15, wherein the multistage separation unit comprises a series of sieves including a final sieve, wherein the sensing plane extends immediately adjacent the final sieve, between the final sieve and the auger.

17. The harvester of claim 15, wherein the at least one movable material flow deflector is movable to alter a path of the crop material through the sensing plane.

18. The harvester of claim 15, wherein the control signals are to provide a more uniform crop flow across the sensing plane as a crop flow passes through the sensing plane.

19. A harvester comprising:
- a multistage separation unit to separate grain from crop material other than grain a grain processing unit; and a material flow sensor to form an electromagnetic plane through which crop material passes while being sensed, wherein the electromagnetic plane is sandwiched between consecutive stages of the separation unit;

a second material flow sensor across an outlet of the multistage separation unit, the second material flow sensor forming a second electromagnetic plane through which crop material passes while being sensed; and a processing unit to determine a grain yield based upon a combination of signals from the material flow sensor and the second material flow sensor.

20. The harvester of claim 19 further comprising:

a movable material flow deflector above the electromagnetic plane; and an actuator to move the movable flow deflector, wherein the processing unit is to output control signals, based upon signals from the material flow sensor, that are to cause the actuator to move the movable material flow deflector to differently deflect portions of crop flow towards different portions of a successive one of the consecutive stages to provide more uniform crop flow to the successive of one of the consecutive stages.

\* \* \* \* \*